US012719341B2

(12) United States Patent
Duncan et al.

(10) Patent No.: US 12,719,341 B2
(45) Date of Patent: Aug. 25, 2026

(54) AXIAL AIR GAP ELECTRIC ROTARY MOTOR

(71) Applicant: Moog Inc., East Aurora, NY (US)

(72) Inventors: Allen G. Duncan, Radford, VA (US); Robert J. Nicholl, East Aurora, NY (US); Michael A. Alen, Dublin, VA (US)

(73) Assignee: Moog Inc., East Aurora, NY (US)

( * ) Notice: Subject to any disclaimer, the term of this patent is extended or adjusted under 35 U.S.C. 154(b) by 226 days.

(21) Appl. No.: 18/563,577

(22) PCT Filed: Jun. 1, 2022

(86) PCT No.: PCT/US2022/031814
§ 371 (c)(1),
(2) Date: Nov. 22, 2023

(87) PCT Pub. No.: WO2022/256433
PCT Pub. Date: Dec. 8, 2022

(65) Prior Publication Data

US 2024/0243645 A1 Jul. 18, 2024

Related U.S. Application Data

(60) Provisional application No. 63/196,658, filed on Jun. 3, 2021.

(51) Int. Cl.
*H02K 21/04* (2006.01)

(52) U.S. Cl.
CPC .................................. *H02K 21/046* (2013.01)

(58) Field of Classification Search
CPC .. H02K 21/046; H02K 21/44; H02K 2201/12; H02K 1/17
See application file for complete search history.

(56) References Cited

U.S. PATENT DOCUMENTS 5,731,649 A 3/1998 Caamano
6,177,746 B1 1/2001 Tupper et al.
(Continued)

FOREIGN PATENT DOCUMENTS

CN 112688523 A 4/2021
WO 2021188758 A1 9/2021

OTHER PUBLICATIONS

Jian Luo et al: Design and experiments of a novel axial flux circumferential current permanent magnet (AFCC) machine with radial airgap, Conference Record of The 2001 IEEE Industry Applications Conference. 36th IAS Annual Meeting. Chicago, IL, Sep. 30-Oct. 4, 2001; vol. 3, Sep. 30, 2001 (Sep. 30, 2001), pp. 1989-1996, XP010561962.

*Primary Examiner* — Tulsidas C Patel
*Assistant Examiner* — Mohammed Ahmed Qureshi
(74) *Attorney, Agent, or Firm* — Harter Secrest & Emery LLP

(57) ABSTRACT

An electric motor assembly comprising a stator having a first radially extending stator pole section, a rotor having a first rotor pole section extending radially from a rotor shaft and a second rotor pole section extending radially from the rotor shaft and spaced axially from the first rotor pole section, the first stator pole section disposed axially between the first and second rotor pole sections and radially overlapping both the first and second rotor pole sections, the stator comprising windings operatively configured to be selectively energized to provide a flux path across a first axial air gap between the first rotor pole section and the first stator pole section, and the first rotor pole section comprising a plurality of radially extending solid unitary pole pieces spaced circumferentially about the central axis of the rotor.

18 Claims, 10 Drawing Sheets

(56) References Cited

U.S. PATENT DOCUMENTS

| | | | | |
|---|---|---|---|---|
| 8,710,711 | B2 * | 4/2014 | Pennander | H02K 1/2791 310/49.31 |
| 9,680,339 | B2 | 6/2017 | Calley | |
| 2010/0295389 | A1 | 11/2010 | Tessier et al. | |
| 2012/0205992 | A1 | 8/2012 | Villaret | |
| 2013/0088112 | A1 * | 4/2013 | Cho | H02K 1/2798 310/156.37 |

* cited by examiner

AXIAL AIR GAP ELECTRIC ROTARY MOTOR

TECHNICAL FIELD

The present disclosure relates generally to electric rotary motors, and more particularly to an assembly for an axial airgap electric rotary motor.

BACKGROUND ART

An electric motor converts electrical energy into mechanical rotational power. Most electric motors operate through the interaction between a stator magnetic field and a rotor magnetic field to generate force within the motor. Rotating motors ordinarily include a stationary component known as a stator and a rotating component known as a rotor. Adjacent faces of the rotor and stator are separated by a small airgap traversed by magnetic flux linking the rotor and stator. Such motors are conventionally classifiable as being either radial or axial airgap types. A radial airgap type is one in which the rotor and stator are separated radially by an air gap and the traversing magnetic flux is directed predominantly perpendicular to the axis of rotation of the rotor. Thus, a radial flux motor has flux running radially in and out from the center of the shaft. Radial airgap types are commonly used and have been studied extensively. In contrast, in an axial airgap motor, the rotor and stator are separated axially by an air gap and the traversing magnetic flux flow includes flow parallel to the rotational axis. Thus, an axial flux motor has flux running axially parallel to the axis of rotation.

U.S. Patent Publication No. 2010/0295389, entitled "Axial Flux Switched Reluctance Motor and Methods of Manufacture," discloses an axial flux motor that utilizes one or more rotor discs spaced along a rotor shaft and stator elements distributed circumferentially about the rotor discs and forming pairs of radially extending stator poles for axially straddling the rotor discs. U.S. Pat. No. 7,378,763, entitled "Linear Motor," discloses a stator core divided into two parts with each of the parts being made of a soft magnetic powder and a mover comprising a section of soft magnetic material and a permanent magnet. A soft magnetic material exhibits high permeability and low magnetic coercivity and may be efficiently magnetized and demagnetized. A permanent magnet has a high magnetic coercivity and strongly retains its magnetization and resists being demagnetized. U.S. Pat. No. 7,884,508, entitled "Linear Motor," also discloses a stator core divided into two parts formed of a soft magnetic powder and a mover that has at least one section also formed of a soft magnetic material.

BRIEF SUMMARY

With parenthetical reference to corresponding parts, portions or surfaces of the disclosed embodiment, merely for the purposes of illustration and not by way of limitation, the present disclosure provides an electric motor assembly (15) comprising: a stator (20); a rotor (30) configured to rotate about a central axis (16) relative to the stator (20); the stator (20) comprising a stator body section (23*a*, 23*b*, 23*c*) and a first stator pole section (22*a*) extending radially from the stator body section (23*a*, 23*b*, 23*c*); the rotor (30) comprising a rotor shaft portion (31) orientated about the central axis (16), a first rotor pole section (32*a*, 132) extending radially from the rotor shaft portion (31) relative to the central axis (16), and a second rotor pole section (32*b*) extending radially from the rotor shaft portion (31) relative to the central axis (16) and spaced axially from the first rotor pole section (32*a*) relative to the central axis (16); the first stator pole section (22*a*) disposed axially between the first rotor pole section (32*a*, 132) and second rotor pole section (32*b*) relative to the central axis (16) and radially overlapping (27) both the first rotor pole section (32*a*, 132) and the second rotor pole section (32*b*) relative to the central axis (16); a first axial air gap (52*a*) between the first rotor pole section (32*a*, 132) and the first stator pole section (22*a*); a second axial air gap (52*b*) between the second rotor pole section (32*b*, 132) and the first stator pole section (22*a*); the stator comprising windings (26*a*, 26*b*) operatively configured to be selectively energized to provide a flux path across the first axial air gap (52*a*) and the second axial air gap (52*b*); and the first rotor pole section (32*a*, 132) comprising a plurality of radially extending solid unitary pole pieces (33, 133) spaced circumferentially about the central axis (16).

The plurality of radially extending solid unitary pole pieces (33, 133) may be each formed of a metal powder material. The plurality of radially extending solid unitary pole pieces (33, 133) may be each formed of a soft magnetic composite material. The second rotor pole section (32*b*) may comprise a plurality of radially extending solid pole pieces (33, 133) spaced circumferentially about the central axis (16). The plurality of radially extending solid pole pieces (33, 133) of the second rotor pole section (32*b*) may be each formed of a soft magnetic composite material.

The stator (20) may comprise a second stator pole section (22*b*) extending radially from the stator body section (23*a*, 23*b*, 23*c*) relative to the central axis (16) and spaced axially from the first stator pole section (22*a*) relative to the central axis (16); the second rotor pole section (22*b*) may be disposed axially between the first stator pole section (32*a*) and second stator pole section (32*b*) and may radially overlap (27) both the first stator pole section (32*a*) and the second stator pole section (32*b*); a third axial air gap (52*c*) may be between the second rotor pole section (32*b*) and the second stator pole section (22*b*); and the windings (26*b*) may be operatively configured to be selectively energized to provide a flux path across the third axial air gap. Each of the plurality of radially extending solid pole pieces (33) of the first rotor pole section (32*a*) may comprise discrete pole pieces having an inner end (34) and an outer end (35).

The first stator pole section (22*a*) may comprise a plurality of magnets (24) and flux concentrators (25) spaced circumferentially about the central axis (16). The windings may comprise a first conductive coil (26*a*) orientated about the central axis (16) and disposed axially between the first rotor pole section (32*a*) and the second rotor pole section (32*b*) and disposed radially between the first stator pole section (22*a*) and the rotor shaft (31). The windings may comprise a first conductive coil (26*a*) orientated about the central axis (16) and disposed axially between the first rotor pole section (32*a*) and the second rotor pole section (32*b*) and disposed radially between the first stator pole section (22*a*) and the rotor shaft (31), and a second conductive coil (26*b*) orientated about the central axis (16) and disposed radially between the second stator pole section (22*b*) and the rotor shaft (31).

The rotor (30) may comprise a first rotor toroid section (42*a*, 142) extending radially from the rotor shaft portion (31) relative to the central axis (16); the first rotor toroid section (42*a*, 142) may be disposed axially between the first rotor pole section (32*a*) and the second rotor pole section (32*b*) relative to the central axis (16); and the first rotor toroid section (42*a*, 142) may radially overlap (43) both the first rotor pole section (32*a*) and the second rotor pole section (32*b*) relative to the central axis (16). The windings may comprise a first conductive coil (26*a*) orientated about the central axis (16) and disposed axially between the first rotor pole section (32*a*) and the second rotor pole section (32*b*); the first conductive coil (26*a*) may be disposed radially between the first stator pole section (22*a*) and the first rotor toroid section (42*a*); and a first inner radial clearance (53*a*) may be between the first conductive coil (26*a*) and the first rotor toroid section (42*a*). The electric motor may comprise a first outer radial clearance (54*a*) between the first rotor pole section (32*a*) and the stator body section (23*a*, 23*b*, 23*c*). The first rotor toroid section (42*a*, 142) may be formed of a soft magnetic composite material.

The plurality of radially extending solid pole pieces (133) spaced circumferentially about the central axis (16) and the first rotor toroid section (142) may be formed as a unitary piece, having a monolithic and isotropic structure, and being of a uniform composition. The plurality of radially extending solid pole pieces and the first rotor toroid section may be formed of a soft magnetic composite material.

The plurality of radially extending solid pole pieces (133) spaced circumferentially about the central axis (16) may be formed as a unitary piece, having a monolithic and isotropic structure, and being of a uniform composition of soft magnetic composite material.

The motor may comprise a third rotor pole section (32*c*), a fourth rotor pole section (32*d*), a second stator pole section (22*b*), and a third stator pole section (22*c*); and the first rotor pole section (32*a*), the first stator pole section (22*a*), the second rotor pole section (32*b*), the second stator pole section (22*b*), the third rotor pole section (32*c*), the third stator pole section (22*c*), and the fourth rotor pole section (32*d*) may be stacked in the axial direction.

DETAILED DESCRIPTION OF THE EMBODIMENTS

Figure 1:
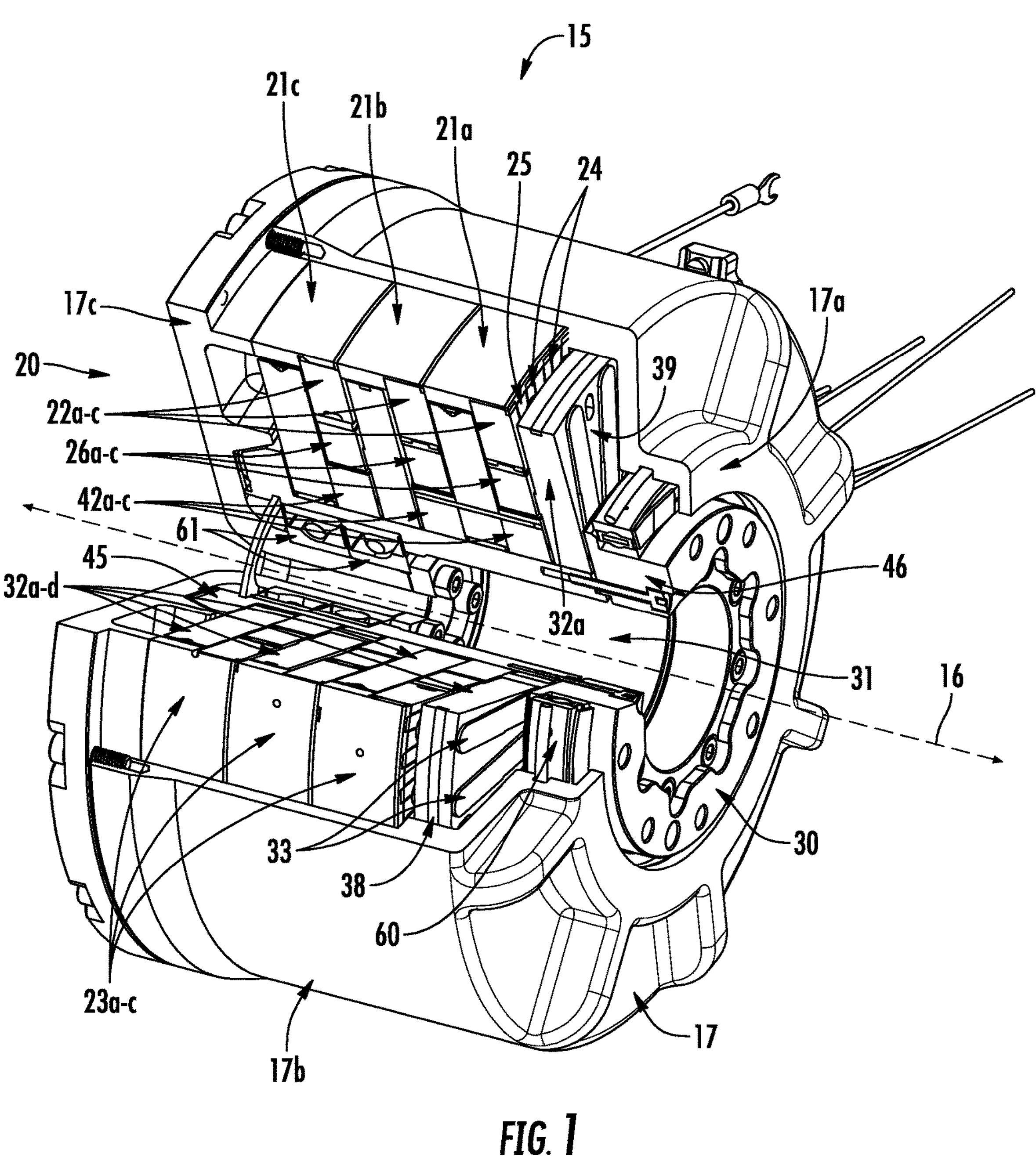
FIG. 1 is an isometric partial cutaway view of a first embodiment of the improved electric motor assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
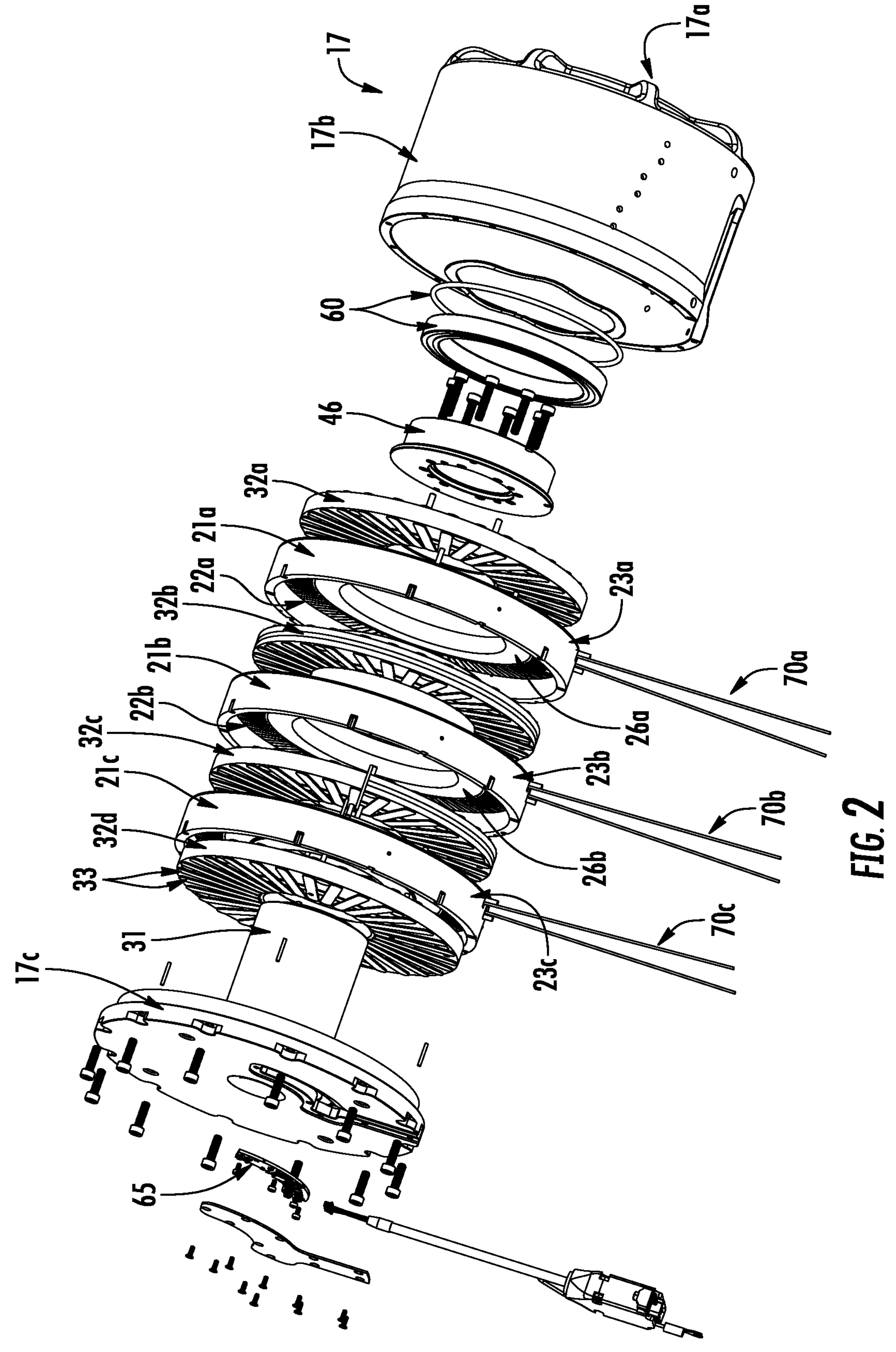
FIG. 2 is an exploded isometric view of the motor assembly shown in FIG. 1.
Figure 3:
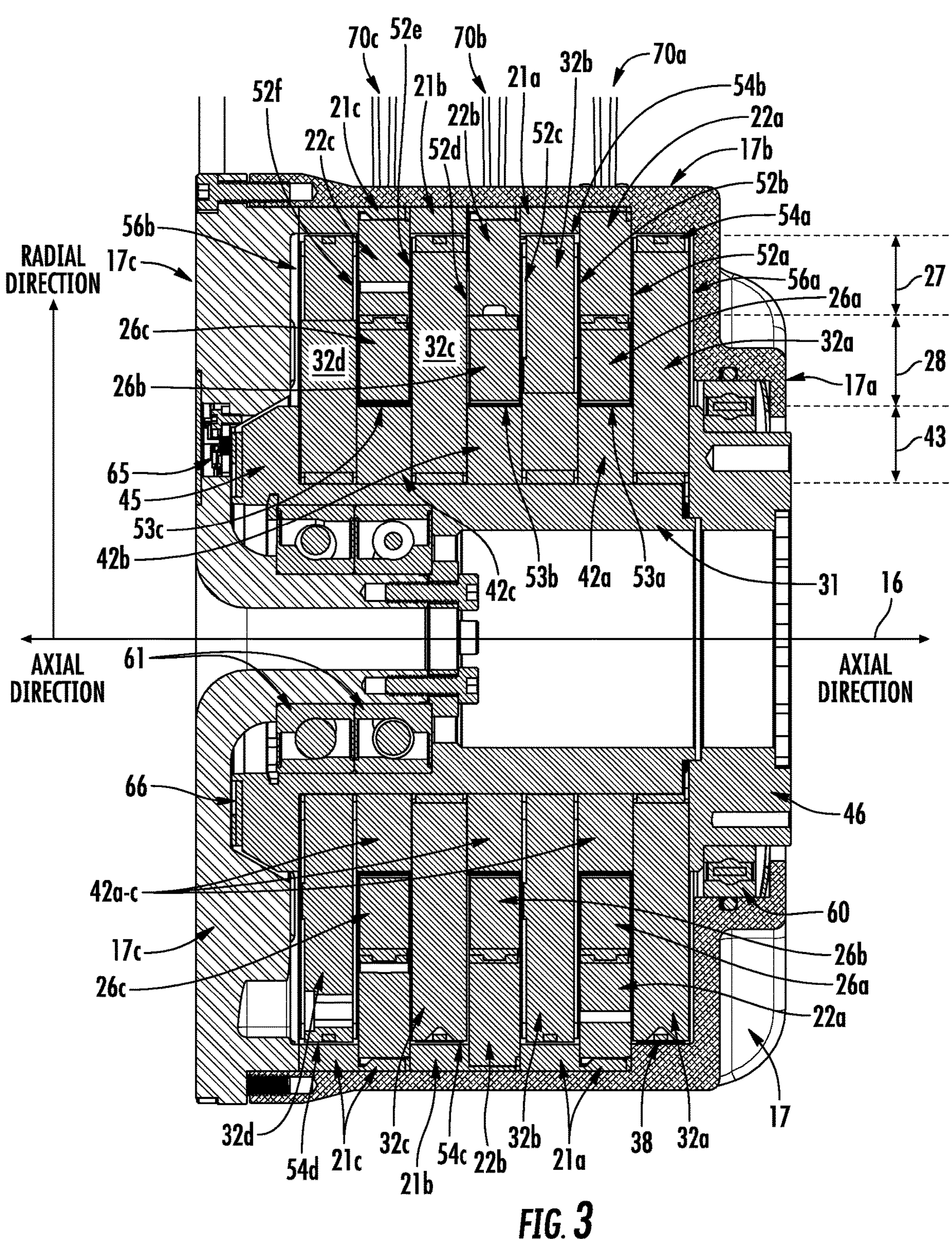
FIG. 3 is a longitudinal cross-sectional view of the motor assembly shown in FIG. 1.
Figure 4:
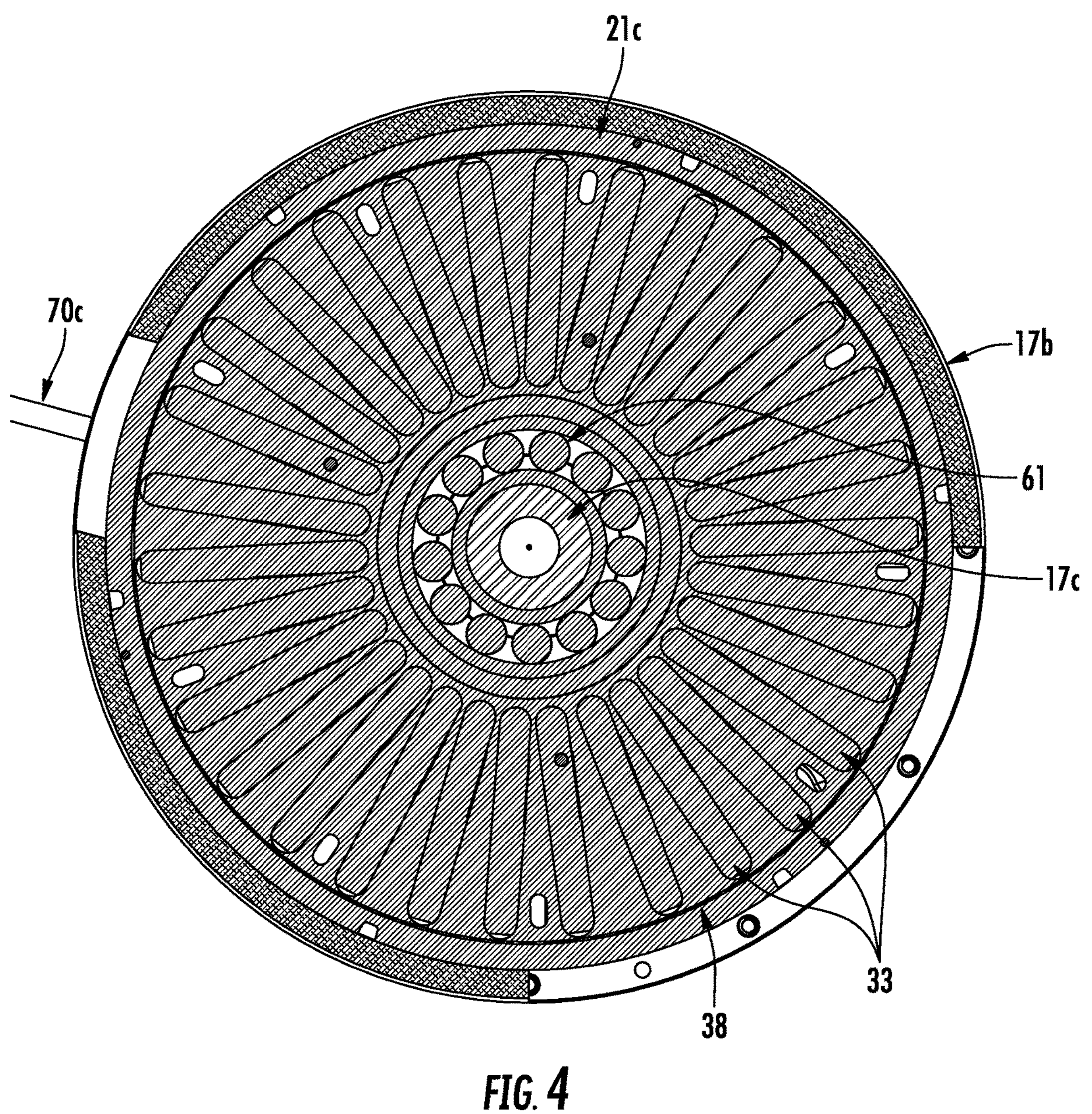
FIG. 4 is a transverse cross-sectional view of the motor assembly shown in FIG. 1.
Figure 5:
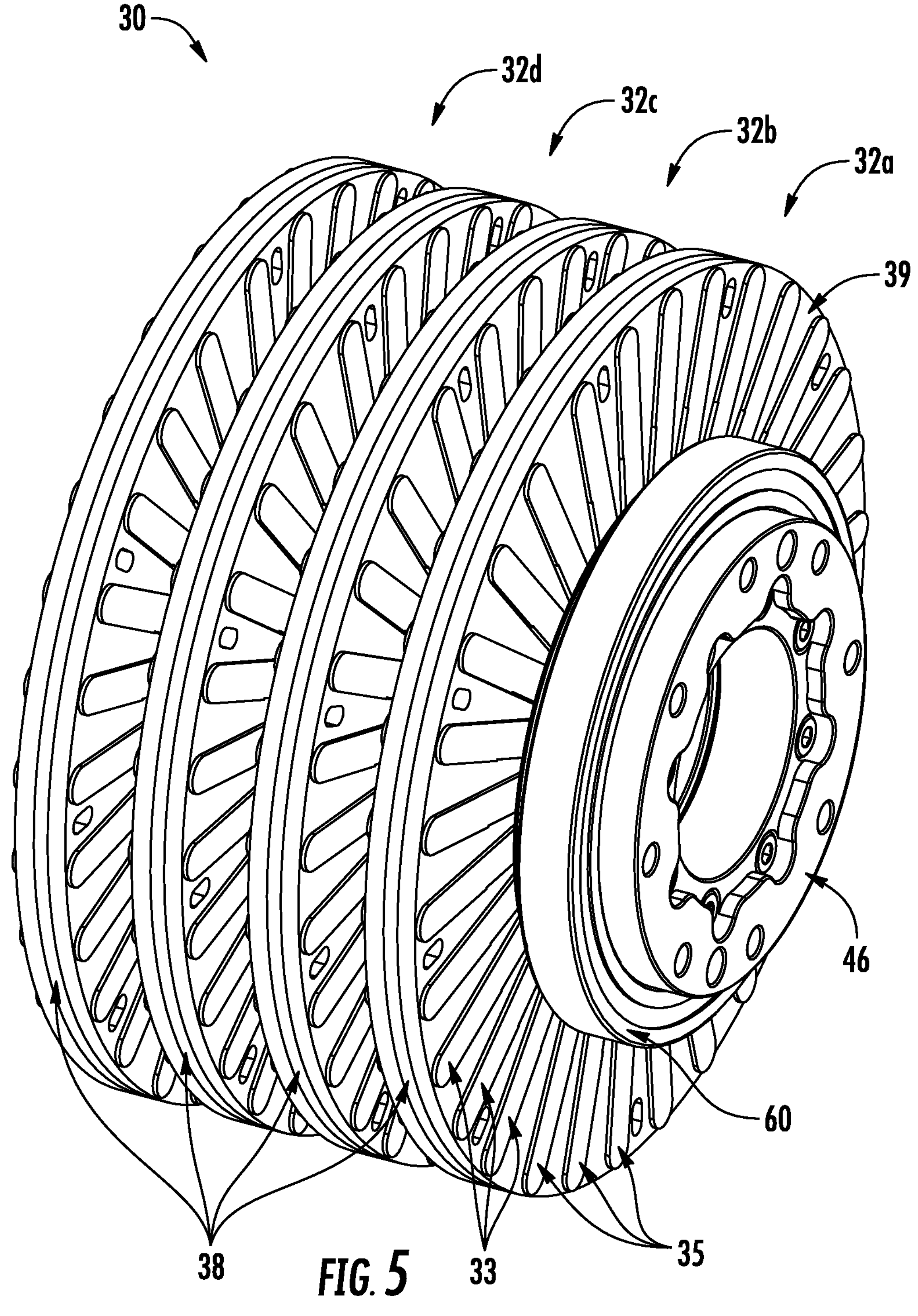
FIG. 5 is an isometric view of the rotor assembly shown in FIG. 1.
Figure 6:
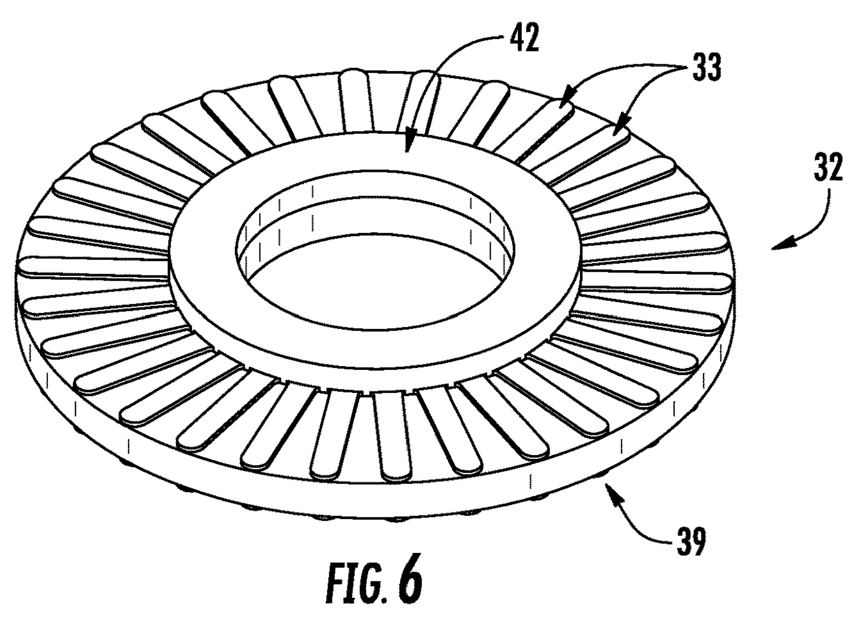
FIG. 6 is an isometric view of a rotor pole section and inner toroid shown in FIG. 5.
Figure 7:
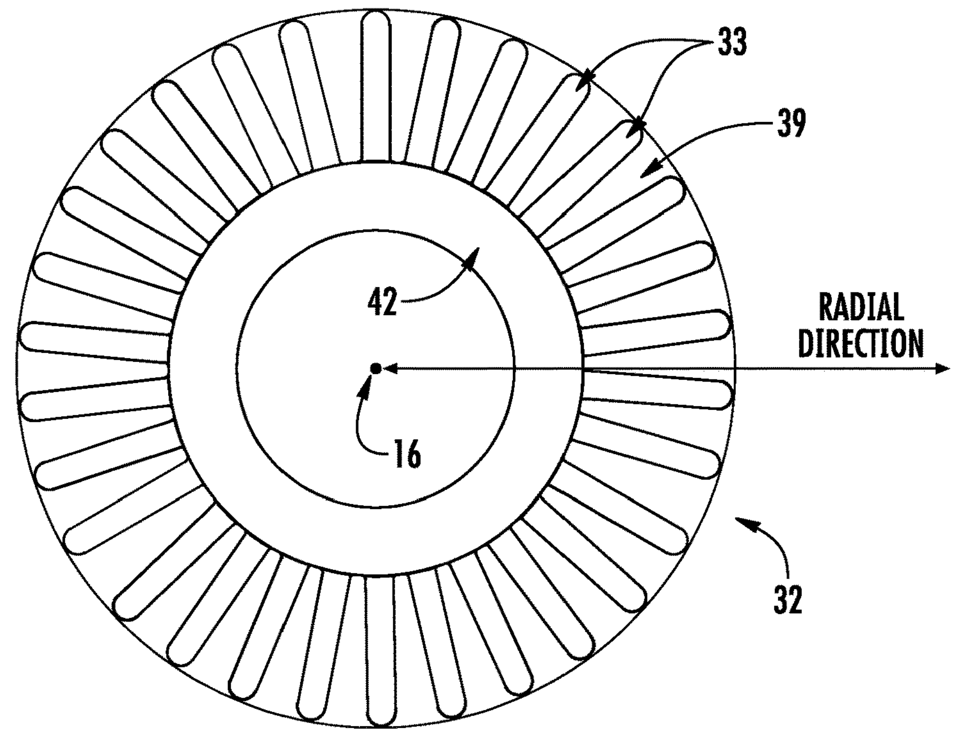
FIG. 7 is a top plan view of the rotor pole section and toroid shown in FIG. 6.
Figure 8:
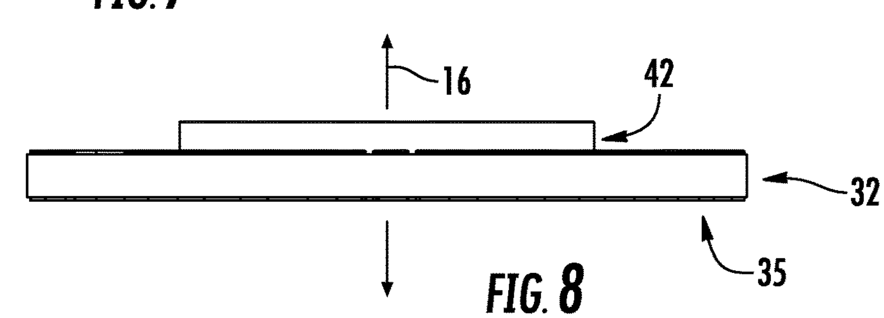
FIG. 8 is a side view of the rotor pole section and toroid shown in FIG. 6.
Figure 9:
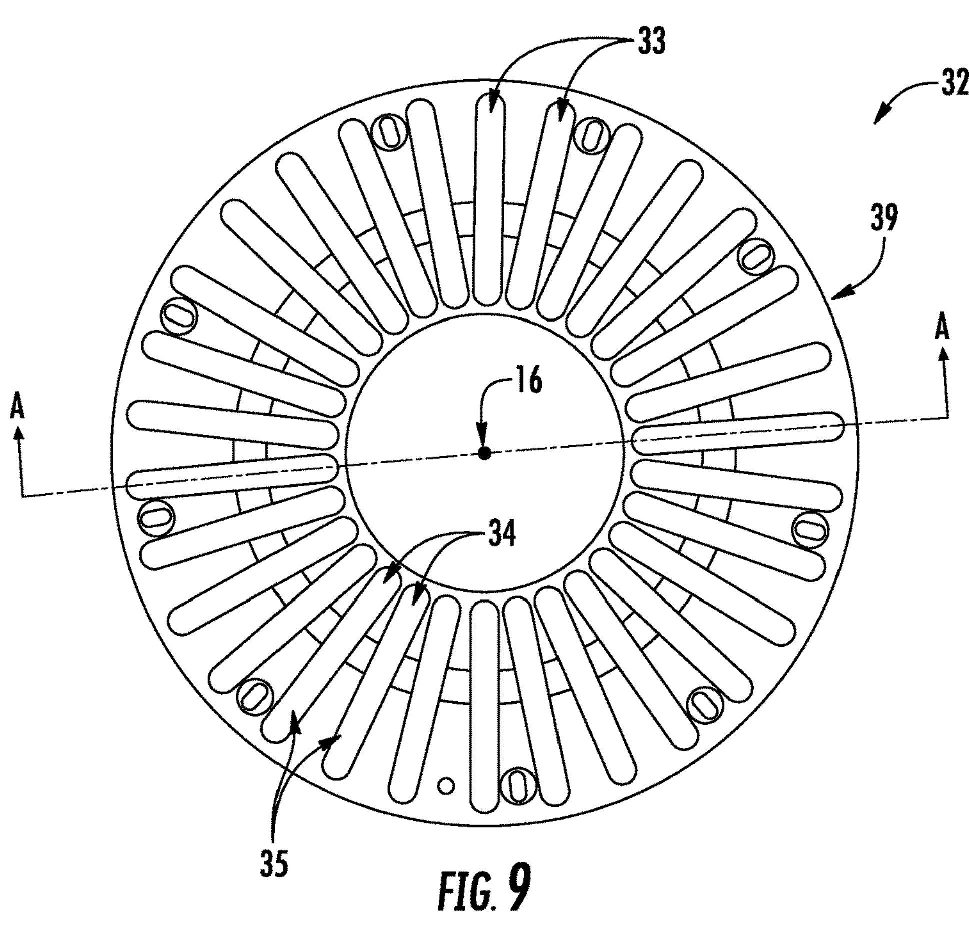
FIG. 9 is a top plan view of the rotor pole section shown in FIG. 6.
Figure 10:
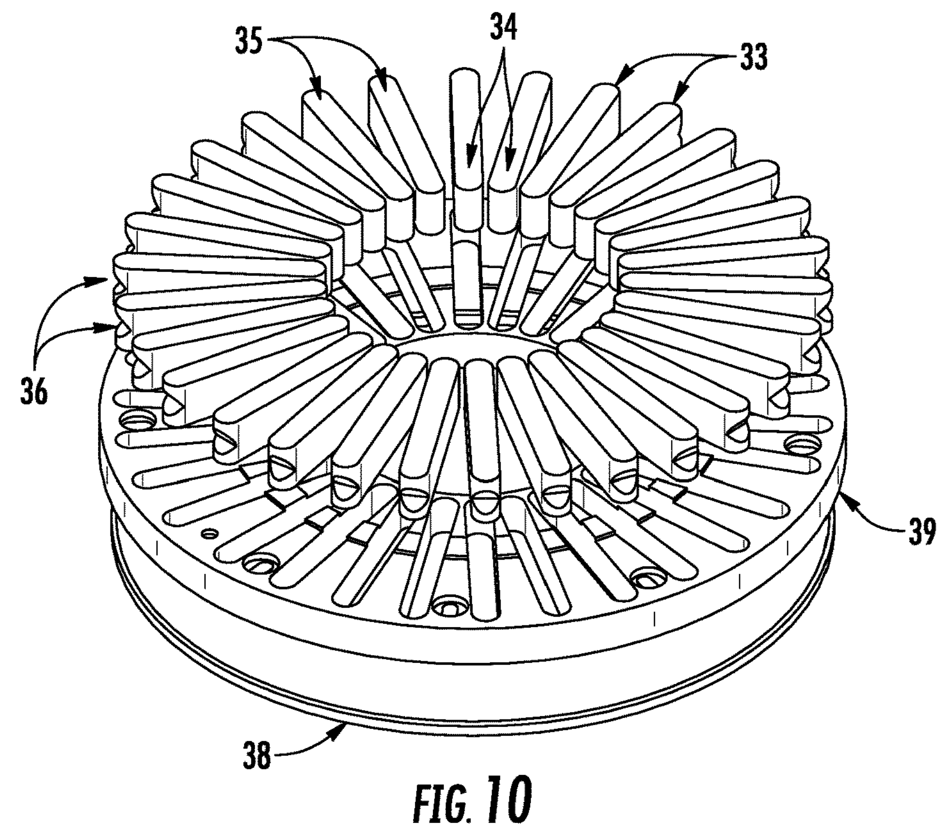
FIG. 10 is an exploded isometric view of the rotor pole section shown in FIG. 9.
Figure 11:
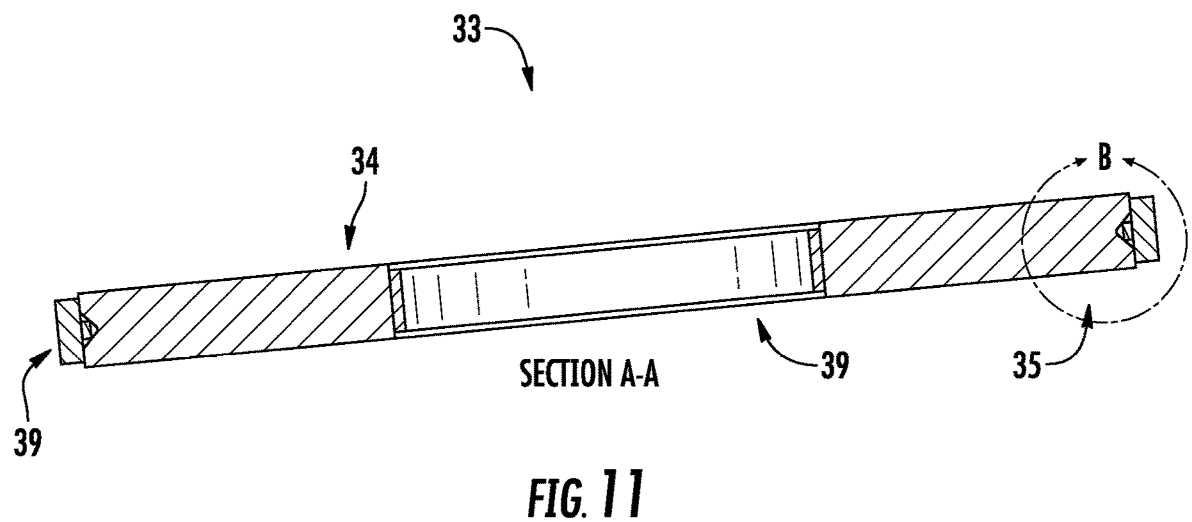
FIG. 11 is a transverse cross-sectional view of the rotor pole section shown in FIG. 9, taken generally on line A-A of FIG. 9.
Figure 12:
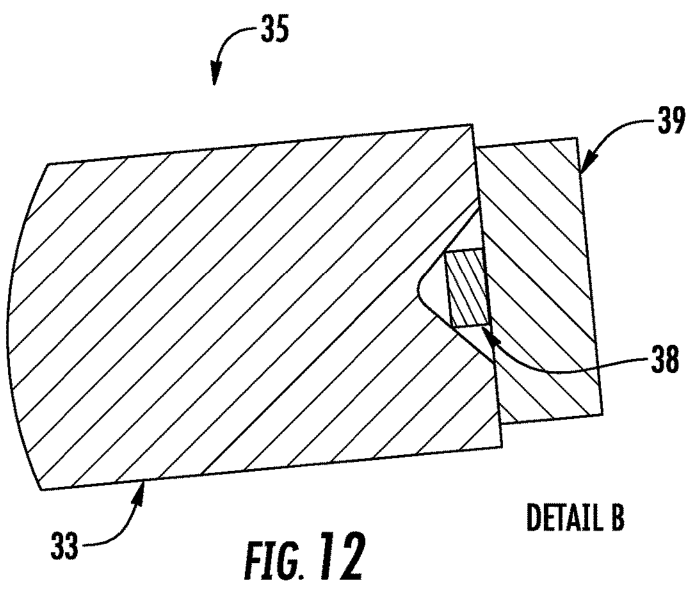
FIG. 12 is an enlarged cross-sectional view of the rotor pole section shown in FIG. 11, taken generally within the indicated circle B of FIG. 11.

An improved electric motor assembly is provided, an embodiment of which is generally indicated at 15. As shown in FIG. 1, motor 15 generally includes motor housing 17 containing stator 20 and rotor 30 configured to rotate about axis 16 relative to stator 20 and motor housing 17. As shown in FIGS. 1-3, housing 17 is a generally hollow cylindrical member comprising right end 17*a* having an opening from which rotor 30 projects, outer cylindrical casing 17*b*, and left end bell 17*c* having a portion projecting into the interior of rotor shaft 31 of rotor 30. Stator 20 is fixedly supported in housing 17 between shaft end 17*a* and end bell 17*c* of housing 17 such that stator 20 does not rotate relative to motor housing 17. Rotor 30 is rotationally supported in housing 17 by annular bearing 60, positioned radially between the outer cylindrical surface of shaft end clamp 46 of rotor 30 and the inner cylindrical surface of housing end 17*a* of housing 17, and annular rolling bearings 61, positioned radially between the inner cylindrical surface of shaft 31 of rotor 30 and the outer cylindrical surface of end bell 17*c* of housing 17. Rotor 30 is thereby rotationally supported in housing 17 between shaft end 17*a* and end bell 17*c* of housing 17 such that rotor 30 is operationally rotatable about axis 16 relative to motor housing 17 and stator 20.

Stator 20 is a generally cylindrical member elongated about axis 16 and having an inner space in which rotor 30 rotates about axis 16 relative to stator 20. Stator 20 is primarily formed from three sections 21*a*, 21*b* and 21*c* that are stacked in the axial direction interior to housing cylinder 17*b* of housing 17 and sandwiched between shaft end 17*a* and end bell 17*c* of housing 17. These individual stator pole sections 21*a*, 21*b* and 21*c* are glued, bolted, clamped or otherwise fastened together in housing 17 to form stator 20.

As shown, stator section 21*a* generally comprises outer cylindrical yoke or body portion 23*a*, stator pole section 22*a* projecting radially inward from outer body portion 23*a*, and inner coil 26*a*. Coil 26*a* comprises a plurality of conductive windings that may be selectively energized via leads 70*a* as desired to magnetically interact with rotor 30 to exert a torque on and rotational movement of rotor 30 relative to stator 20.

In this embodiment, pole section 22*a* generally comprises a plurality of circumferentially spaced alternating permanent magnets 24 and flux concentrators 25 that extend radially in from and are supported by outer cylindrical body portion 21*a*. Each of magnets 24 extends axially along longitudinal axis 16 of yoke portion 21*a* and is positioned radially about axis 16 on the inner circumference of body portion 21*a* to thereby form magnetic poles. Magnets 24 are permanently affixed around the inner circumference of body portion 21*a*. Each of concentrators 25 also extends axially along longitudinal axis 16 of yoke portion 21*a* and is positioned radially about axis 16 on the inner circumference of body portion 21*a*. Concentrators 25 are permanently affixed around the inner circumference of body portion 21*a* between magnets 24. Thus, stator pole section 22*a* includes a plurality of flux concentrators 25 between a plurality of magnetic poles 24, with each of flux concentrators 25 and magnetic poles 24 extending axially along longitudinal axis 16 and positioned radially about axis 16 such that each flux concentrator 25 alternates with each magnetic pole 24 on the inner circumference of cylindrical outer body portion 21*a* about axis 16.

As shown, stator section 21*b* generally comprises outer cylindrical yoke or body portion 23*b*, stator pole section 22*b* projecting radially inward from outer body portion 23*b*, and inner coil 26*b*. Coil 26*b* comprises a plurality of conductive windings that may be selectively energized via leads 70*b* as desired to magnetically interact with rotor 30 to cause torque and rotational movement of rotor 30 relative to stator 20.

In this embodiment, pole section 22*b* generally comprises a plurality of circumferentially spaced alternating permanent magnets 24 and flux concentrators 25 that extend radially in from and are supported by outer cylindrical body portion 21*b*. Each of magnets 24 extends axially along longitudinal axis 16 of yoke portion 21*b* and is positioned radially about axis 16 on the inner circumference of body portion 21*b* to thereby form magnetic poles. Magnets 24 are permanently affixed around the inner circumference of body portion 21*b*. Each of concentrators 25 also extends axially along longitudinal axis 16 of yoke portion 21*b* and is positioned radially about axis 16 on the inner circumference of body portion 21*b*. Concentrators 25 are permanently affixed around the inner circumference of body portion 21*b* between magnets 24. Thus, stator pole section 22*b* includes a plurality of flux concentrators 25 between a plurality of magnetic poles 24, with each of flux concentrators 25 and magnetic poles 24 extending axially along longitudinal axis 16 and positioned radially about axis 16 such that each flux concentrator 25 alternates with each magnetic pole 24 on the inner circumference of cylindrical outer body portion 21*b* about axis 16.

As shown, stator section 21*c* generally comprises outer cylindrical yoke or body portion 23*c*, stator pole section 22*c* projecting radially inward from outer body portion 23*c*, and inner coil 26*c*. Coil 26*c* comprises a plurality of conductive windings that may be selectively energized via leads 70*c* as desired to magnetically interact with rotor 30 to cause torque and rotational movement of rotor 30 relative to stator 20.

In this embodiment, stator pole section 22*c* generally comprises a plurality of circumferentially spaced alternating permanent magnets 24 and flux concentrators 25 that extend radially in from and are supported by outer cylindrical body portion 21*c*. Each of magnets 24 extends axially along longitudinal axis 16 of yoke portion 21*c* and is positioned radially about axis 16 on the inner circumference of body portion 21*c* to thereby form magnetic poles. Magnets 24 are permanently affixed around the inner circumference of body portion 21*c*. Each of concentrators 25 also extends axially along longitudinal axis 16 of yoke portion 21*c* and is positioned radially about axis 16 on the inner circumference of body portion 21*c*. Concentrators 25 are permanently affixed around the inner circumference of body portion 21*c* between magnets 24. In this embodiment, concentrators 25 are of a uniform composition and are formed from metal powder such as a soft magnetic composite (SMC) material. Thus, stator pole section 22*c* includes a plurality of flux concentrators 25 between a plurality of magnetic poles 24, with each of flux concentrators 25 and magnetic poles 24 extending axially along longitudinal axis 16 and positioned radially about axis 16 such that each flux concentrator 25 alternates with each magnetic pole 24 on the inner circumference of cylindrical outer body portion 21*c* about axis 16.

Coils 26*a*, 26*b* and 26*c* comprise electromagnetic windings that include at least one turn. Coils 26*a*, 26*b* and 26*c* are each wound with copper, aluminum wires, ribbons, or any other material suitable for the intended purpose and understood by one of ordinary skill in the art. While coils 26*a*, 26*b* and 26*c* are shown with a relatively square cross-section, other embodiments may include an annular coil having a circular or oblong cross-section.

Rotor 30 is a generally cylindrical member elongated about axis 16 and generally includes shaft 31 having at the left end annular retaining shoulder 45 and having at the right end annular end clamp 46. In this embodiment, four rotor disks or pole sections 32*a*, 32*b*, 32*c* and 32*d* and three toroid sections 42*a*, 42*b* and 42*c* are stacked in the axial direction on shaft 31 and sandwiched between shaft retaining shoulder 45 and shaft clamp 46. Moving left to right with reference to FIGS. 1-3, rotor pole section 32*d* is stacked against the right annular face of retaining shoulder 45, toroid 42*c* is stacked against the right annular face of rotor pole section 32*d*, rotor pole section 32*c* is stacked against the right annular face of toroid 42*c*, toroid 42*b* is stacked against the right annular face of rotor pole section 32*c*, rotor pole section 32*b* is stacked against the right annular face of toroid 42*b*, toroid 42*a* is stacked against the right annular face of rotor pole section 32*b*, rotor pole section 32*a* is stacked against the right annular face of toroid 42*a*, and end clamp 46 is stacked against the right annular face of rotor pole section 32*a* and bolted to rotor shaft 31 to clamp the rotor assembly together. These individual rotor pole sections 32*a*, 32*b*, 32*c* and 32*d* and rotor toroid sections 42*a*, 42*b* and 42*c* are glued, bolted, clamped or otherwise fastened together and on shaft between retaining shoulder 45 and end clamp 46 to form rotor 30.

As shown in FIGS. 4-12, each of stator pole sections 32*a*, 32*b*, 32*c* and 32*d* are annular disk-shaped members formed of a plurality of radially extending solid pole pieces 33 spaced circumferentially about central axis 16 and radially retained in solid support plate 39. In this embodiment, pole pieces 33 are solid unitary pieces with high permeability, low coercivity, high electric resistivity, structural strength and low eddy current loss. In this embodiment, pole pieces 33 have a monolithic and isotropic structure, are of a uniform composition, and are formed from a metal powder such as a soft magnetic composite material. Soft magnetic composite materials exhibit high permeability and low magnetic coercivity and typically comprise iron powder particles that are each coated and bonded with electrically insulating material to form a solid bulk material. The iron powder particles typically have high purity and compressibility and the particle coating provides high electrical resistivity, insulating each individual particle, which restricts eddy current creation. The coated powder is pressed into a die to form a solid material, which is then heat-treated using low temperatures to cure the bond. Thus, by way of example and without limitation, pole pieces 33 may be manufactured using a powdered metal compaction process in which powdered magnetic material is compacted in a custom die to form a solid unitary piece. Other types of materials and powders may be used as alternatives to form solid unitary pole piece 33, depending on the application. Examples include, without limitation, low carbon steels, silicon steels, cobalt-iron based alloys, phosphorous-iron based alloys, nickel-iron based alloys, additive manufactured (AM) powder iron or iron alloys, pure iron power particles encapsulated with inorganic insulation, and other ferromagnetic powder particles coated with an electrical insulating film.

As shown, each of radially extending solid pole pieces 33 spaced circumferentially about central axis 16 are further radially supported by retaining ring 38 in support plate 39. As shown in FIGS. 4, 5 and 10-12, in this embodiment each of the solid pole pieces 33 comprise discrete linear pole pieces having inner end 34 and outer end 35. Inner ends 34 of pole pieces 33 are spaced about axis 16 at the same radial distance from axis 16 and outer ends 35 of pole pieces 33 are spaced about axis 16 at the same radial distance from axis 16. Outer ends 35 of each discrete pole piece 33 include inwardly extending radial notches 36. Notches 36 are configured to receive retaining ring 38, which is secured in notches 36 by the transfer molding material of support plate 39. In this embodiment, as an example and without limitation, retaining ring 38 may be fiberglass or titanium. In this embodiment, support plate 39 is formed of an injected transfer molding material, examples of which may include, without limitation, thermoset plastic and epoxy resin.

As shown in FIGS. 4-12 and 16-18, in this embodiment each of rotor toroid sections **42*a*, 42*b*, and 42*c* are annular square solid unitary toroidal members orientated about axis 16. In this embodiment, rotor toroid sections 42*a*, 42*b*, and 42*c* are solid unitary pieces with high permeability, low coercivity, and high resistivity. In this embodiment, rotor toroid sections 42*a*, 42*b*, and 42*c* have a monolithic and isotropic structure, are of a uniform composition and are formed from a metal powder such as a soft magnetic composite material. For example, and without limitation, rotor toroid sections 42*a*, 42*b*, and 42*c*** may be manufactured using a powdered metal compaction process in which powdered magnetic material is compacted in a custom die. Other types of materials and powders may be used as alternatives, depending on the application. Examples include, without limitation, low carbon steels, silicon steels, cobalt-iron based alloys, phosphorous-iron based alloys, nickel-iron based alloys, additive manufactured powder iron or iron alloys, pure iron power particles encapsulated with inorganic insulation, and other ferromagnetic powder particles coated with an electrical insulating film.

As shown, inner ends 34 of pole pieces 33 radially overlap their adjacent toroid sections such that inner ends 34 of pole pieces 33 are spaced a radial distance from axis 16 that is greater than the inner radius of toroid sections **42*a*, 42*b* and 42*c* and less than the outer radius of toroid sections 42*a*, 42*b* and 42*c*, respectively. Outer ends 35 of pole pieces 33 radially overlap their adjacent stator pole sections such that outer ends 35 of pole pieces 33 are spaced a radial distance from axis 16 that is greater than the inner radius of stator pole sections 22*a*, 22*b* and 22*c***, respectively.

As shown in FIGS. 1-3, the four rotor pole sections **32*a*, 32*b*, 32*c* and 32*d* and the three stator pole sections 22*a*, 22*b* and 22*c* are alternately stacked in the axial direction and in part radially overlap each other, with axial air gaps 52*a*, 52*b* and 52*c* therebetween. Moving right to left with reference to FIGS. 1-3 and regarding radial overlap 27 between stator 20 and rotor 30, the left annular face of rotor pole section 32*a* faces the right annular face of stator pole section 22*a* across axial air gap 52*a* in their radial overlap 27, the right annular face of rotor pole section 32*b* faces the left annular face of stator pole section 22*a* across axial air gap 52*b* in their radial overlap 27, the left annular face of rotor pole section 32*b* faces the right annular face of stator pole section 22*b* across axial air gap 52*c* in their radial overlap 27, the right annular face of rotor pole section 32*c* faces the left annular face of stator pole section 22*b* across axial air gap 52*d* in their radial overlap 27, the left annular face of rotor pole section 32*c* faces the right annular face of stator pole section 22*c* across axial air gap 52*e* in their radial overlap 27, and the right annular face of rotor pole section 32*d* faces the right annular face of stator pole section 22*c* across axial air gap 52*f* in their radial overlap 27. As shown, outer ends 35 of pole pieces 33 radially overlap their adjacent stator pole sections such that outer ends 35 of pole pieces 33 are spaced a radial distance from axis 16 that is greater than the inner radius of stator pole sections 22*a*, 22*b* and 22*c***, respectively.

Moving right to left with reference to FIGS. 1-3 and regarding radial overlap 28 between stator 20 and rotor 30, the left annular face of rotor pole section **32*a* faces the right annular face of coil 26*a* across axial air gap 52*a* in their radial overlap 28, the right annular face of rotor pole section 32*b* faces the left annular face of coil 26*a* across axial air gap 52*b* in their radial overlap 28, the left annular face of rotor pole section 32*b* faces the right annular face of coil 26*b* across axial air gap 52*c* in their radial overlap 28, the right annular face of rotor pole section 32*c* faces the left annular face of coil 26*b* across axial air gap 52*d* in their radial overlap 28, the left annular face of rotor pole section 32*c* faces the right annular face of coil 26*c* across axial air gap 52*e* in their radial overlap 28, and the right annular face of rotor pole section 32*d* faces the right annular face of coil 26*c* across axial air gap 52*f* in their radial overlap 28. Regarding radial overlap 27 and 28 between housing 17 and rotor 30, the left annular face of rotor pole section 32*d* faces the right annular face of housing bell end 17*c* across axial air gap or clearance 56*b* in their radial overlap 27 and 28, and the right annular face of rotor pole section 32*a* faces the right annular face of housing end 17*a* across axial air gap or clearance 56*a* in their radial overlap 27 and 28**.

Moving right to left with reference to FIGS. 1-3 and regarding the radial air gaps or clearances between stator 20 and rotor 30 where they axially overlap, the outer cylindrical surface of rotor pole section **32*a* faces the inner cylindrical surface of housing 17*b* across radial air gap 54*a* in their axial overlap, the outer cylindrical surface of rotor pole section 32*b* faces the inner cylindrical surface of stator body 21*a* across radial air gap 54*b* in their axial overlap, the outer cylindrical surface of rotor pole section 32*c* faces the inner cylindrical surface of stator body 21*b* across radial air gap 54*c* in their axial overlap, and the outer cylindrical surface of rotor pole section 32*d* faces the inner cylindrical surface of stator body 21*c* across radial air gap 54*d* in their axial overlap. Similarly, the outer cylindrical surface of rotor toroid section 42*a* faces the inner cylindrical surface of coil 26*a* across radial air gap 53*a* in their axial overlap, the outer cylindrical surface of rotor toroid section 42*b* faces the inner cylindrical surface of coil 26*b* across radial air gap 53*b* in their axial overlap, and the outer cylindrical surface of rotor toroid section 42*c* faces the inner cylindrical surface of coil 26*c* across radial air gap 53*c*** in their axial overlap.

Accordingly, stator 20 comprises stator pole section 22_a_ extending radially from stator body section 23_a_. Rotor 30 comprises rotor shaft 31 orientated about the central axis 16 with rotor pole section 32_a_ extending radially from rotor shaft 31 relative to the central axis 16 and rotor pole section 32_b_ extending radially from rotor shaft 31 and spaced axially from rotor pole section 32_a_ relative to the central axis 16. Stator pole section 22_a_ is disposed axially between rotor pole section 32_a_ and rotor pole section 32_b_ relative to central axis 16 and radially overlapping 27 both rotor pole section 32_a_ and rotor pole section 32_b_ relative to the central axis 16 with axial air gap 52_a_ between rotor pole section 32_a_ and stator pole section 22_a_ and axial air gap 52_b_ between rotor pole section 32_b_ and stator pole section 22_a_. Windings coils 26_a_ are operatively configured to be selectively energized to generally provide a flux path that extends from stator pole section 22_a_ across axial air gap 52_a_ into rotor pole section 32_a_, radially through pole pieces 33 of rotor pole sections 32_a_ from outer ends 35 of pole pieces 33 of rotor pole section 32_a_ to inner ends 34 of pole pieces 33 of rotor pole section 32_a_, axially through rotor toroid 42_a_, radially through pole pieces 33 of rotor pole sections 32_b_ from inner ends 34 of pole pieces 33 of rotor pole section 32_b_ to outer ends 35 of pole pieces 33 of rotor pole section 32_b_, and across axial air gap 52_b_ into stator pole section 22_a_.

Windings coils 26_b_ are operatively configured to be selectively energized to generally provide a flux path that extends from stator pole section 22_b_ across axial air gap 52_c_ into rotor pole section 32_b_, radially through pole pieces 33 of rotor pole sections 32_b_ from outer ends 35 of pole pieces 33 of rotor pole section 32_b_ to inner ends 34 of pole pieces 33 of rotor pole section 32_b_, axially through rotor toroid 42_b_, radially through pole pieces 33 of rotor pole sections 32_c_ from inner ends 34 of pole pieces 33 of rotor pole section 32_c_ to outer ends 35 of pole pieces 33 of rotor pole section 32_c_, and across axial air gap 52_d_ into stator pole section 22_b_.

Windings coils 26_c_ are operatively configured to be selectively energized to generally provide a flux path that extends from stator pole section 22_c_ across axial air gap 52_e_ into rotor pole section 32_c_, radially through pole pieces 33 of rotor pole sections 32_c_ from outer ends 35 of pole pieces 33 of rotor pole section 32_c_ to inner ends 34 of pole pieces 33 of rotor pole section 32_c_, axially through rotor toroid 42_c_, radially through pole pieces 33 of rotor pole sections 32_d_ from inner ends 34 of pole pieces 33 of rotor pole section 32_d_ to outer ends 35 of pole pieces 33 of rotor pole section 32_d_, and across axial air gap 52_f_ into stator pole section 22_c_.

Accordingly, a series of annular coils 26_a_, 26_b_ and 26_c_ and stator pole sections 22_a_, 22_b_ and 22_c_ may be stacked axially to form a multiphase motor. In the embodiment shown in FIGS. 1-3, three-phase motor 15 includes three stator assembly sections 21_a_, 21_b_ and 21_c_ enclosed in housing 17. Stator assembly sections 21_a_, 21_b_ and 21_c_ are aligned axially in housing 17 and are sandwiched between end portion 17_a_ and end portion 17_c_ of housing 17. Stator section 21_a_ is for the first of the three phases, stator section 21_b_ is for the second of the three phases, and stator section 21_c_ is for the third of the three phases.

Motor 15 includes rotary encoder 65 for determining the angular position of rotor 30 via encoder magnet assembly 66 mounted on shaft 31. With the feedback information provided by encoder 65, the position of rotor 30 is known and the motor controller can generate the magnetic field so that electric motor 15 rotates at the desired speed and torque. Drive electronics, based on encoder 65 angular position feedback received by the motor controller, generate and commutate the stator fields to vary the speed and direction of motor 15. Accordingly, motor 15 will selectively apply a torque on rotor 30 in one direction about axis 16 at varying speeds and will apply a torque on rotor 30 in the opposite direction about axis 16 at varying speeds. Other position sensors may be used as alternatives. A position sensor may be any electrical device for measuring the position, or a derivative of position, or distance from an object, examples of which include an encoder, a resolver, a linear variable differential transformer, a variable resistor, a variable capacitor, a laser rangefinder, an ultrasonic range detector, an infrared range detector, or other similar devices.

Figures 13, 14, 15:
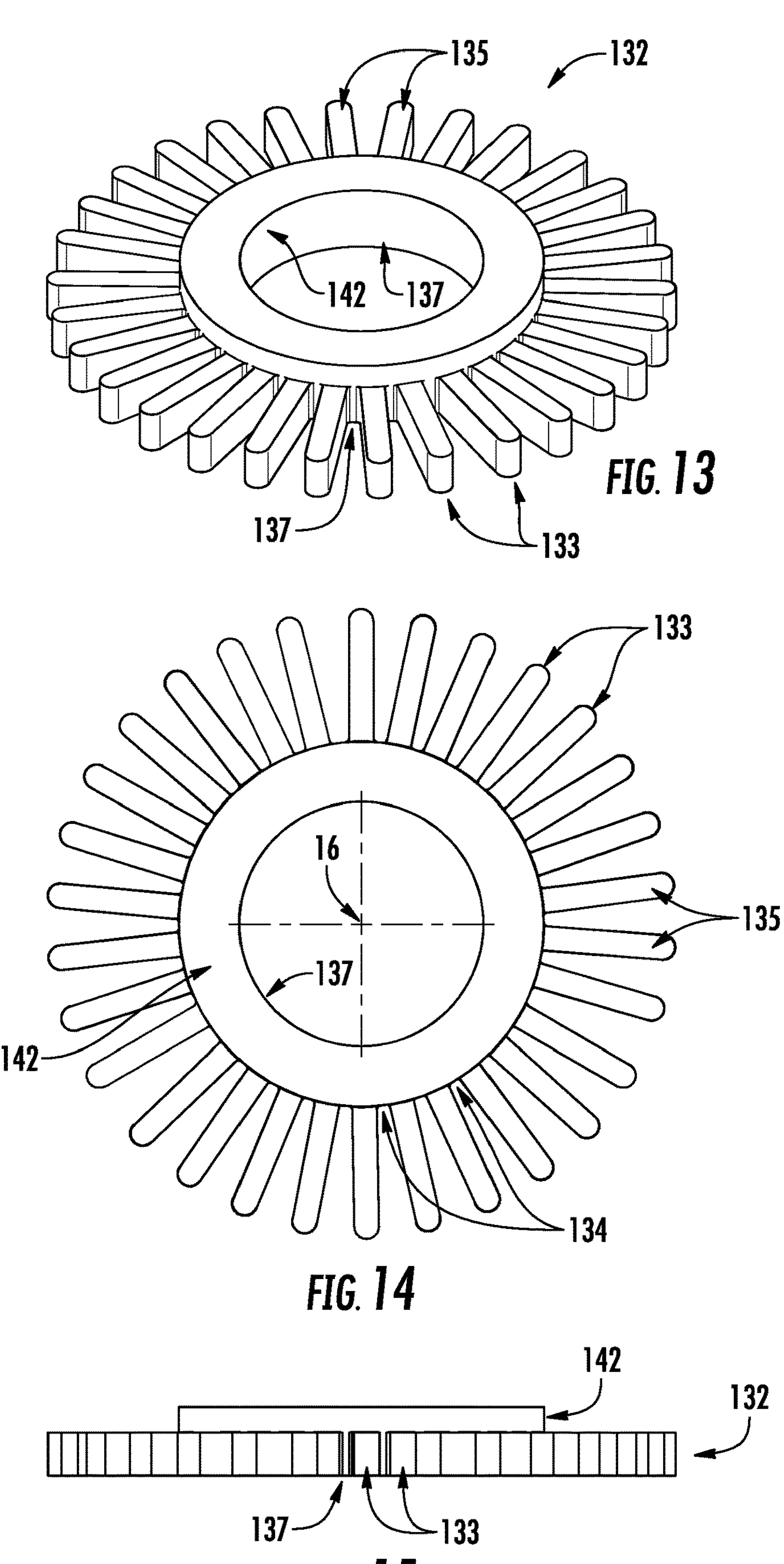
FIG. 13 is an isometric view of a second embodiment of a rotor pole section and inner toroid shown in FIG. 6.
FIG. 14 is a top plan view of the rotor pole section and toroid shown in FIG. 13.
FIG. 15 is a side view of the rotor pole section and toroid shown in FIG. 13.
Figure 16:
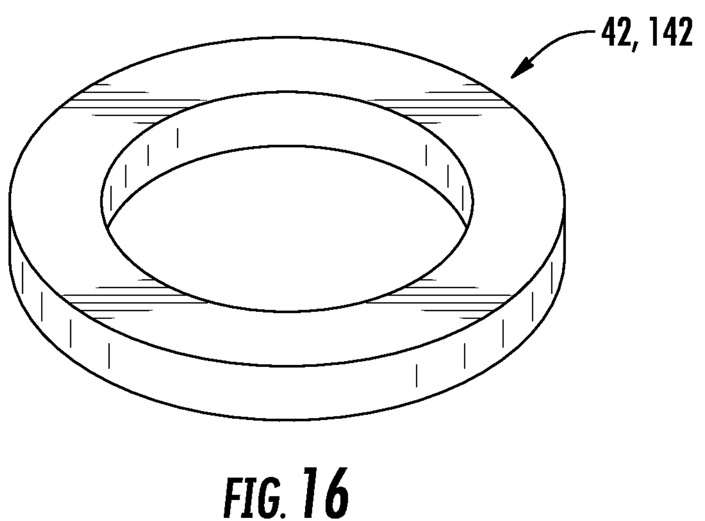
FIG. 16 is an isometric view of the toroid shown in FIGS. 6 and 13.
Figure 17:
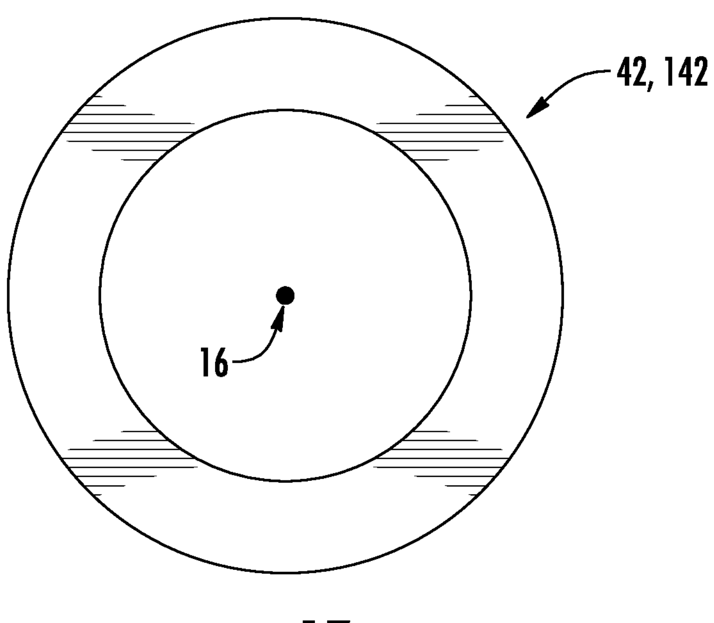
FIG. 17 is a top plan view of the toroid shown in FIG. 16.
Figure 18:
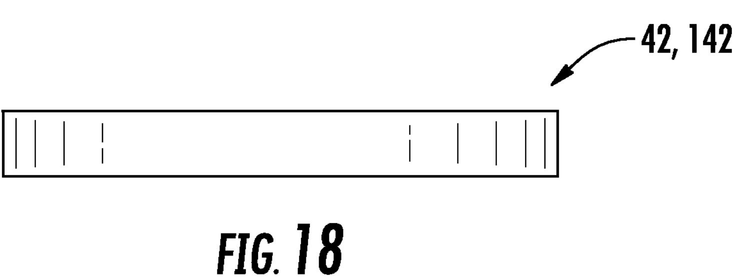
FIG. 18 is a side view of the toroid shown in FIG. 16.

FIGS. 13-15 show a second embodiment 132 of the rotor pole sections and toroids stacked on shaft 31. In this embodiment, the rotor pole sections and toroids are formed as one unitary piece 132. In this embodiment, combined rotor pole and toroid section 132 is a solid unitary piece with high permeability, low coercivity, and high resistivity. In this embodiment, sections 132 have a monolithic and isotropic structure, are of a uniform composition and are formed from a metal powder such as a soft magnetic composite material. For example, and without limitation, sections 132 may be manufactured using a powdered metal compaction process in which powdered magnetic material is compacted in a custom die. Other types of materials and powders may be used as alternatives, depending on the application. Examples include, without limitation, low carbon steels, silicon steels, cobalt-iron based alloys, phosphorous-iron based alloys, nickel-iron based alloys, additive manufactured powder iron or iron alloys, pure iron power particles encapsulated with inorganic insulation, and other ferromagnetic powder particles coated with an electrical insulating film.

As shown, rotor pole section 132 does not include a support plate or a retaining ring. Instead, rotor pole section 132 comprises a plurality of radially extending solid pole pieces 133 spaced circumferentially about central axis 16 and radially extending like spokes from solid inner support ring 137, which includes integrated toroid 142, to individual outer ends 135. In this embodiment, each of solid pole pieces 133 are formed from a metal powder such as a soft magnetic composite material, inner support ring 137 is formed from a metal powder such as a soft magnetic composite material, and toroid 142 is formed from a metal powder such as a soft magnetic composite material, to thereby form a unitary monolithic integrated structure. Such structure may be a monolithic element constructed by an additive manufacturing process. As shown, the inner ends 134 of pole pieces 133 are integral to solid inner support ring portion 137, which radially overlaps adjacent toroid portion 142, with the inner radius of inner support ring portion 137 being the same as the inner radius of axially adjacent toroid portion 142 and the outer radius of inner support ring portion 137 being the same as the outer radius of axially adjacent toroid portion 142. Outer ends 135 of pole pieces 133 radially overlap their adjacent stator pole sections such that outer ends 135 of pole pieces 133 are spaced a radial distance from axis 16 that is greater than the inner radius of stator pole sections 22_a_, 22_b_ and 22_c_, respectively.

The improved electric motor assembly 15 provides a number of advantages over the prior art. Such advantages include high magnetic permeability, high resistivity, reduced eddy current losses, low core loss, increased structural integrity due to the solid construction of the pole pieces when compared to slit lamination-formed poles, for example, improved machinability, more precise dimensional control in production, easier manufacturing, less lead time, and lower cost.

The present invention contemplates that many changes and modifications may be made. The diameter size of the components are scalable, depending on the performance desired from the final motor. The length of the assembled motor, the axial thickness of the pole sections, and the number of pole sections are scalable, again depending on the performance desired and the practical manufacturing limits of the components. Therefore, while the presently preferred form of the motor assembly has been shown and described, those persons skilled in this art will readily appreciate the various additional changes and modification may be made without departing from the spirit of the invention, as defined and differentiated by the following claims.

What is claimed is:

1. An electric motor assembly comprising:

a stator;

a rotor configured to rotate about a central axis relative to said stator;

said stator comprising a stator body section and a first stator pole section extending radially from said stator body section;

said rotor comprising a rotor shaft portion orientated about said central axis, a first rotor pole section extending radially from said rotor shaft portion relative to said central axis, and a second rotor pole section extending radially from said rotor shaft portion relative to said central axis and spaced axially from said first rotor pole section relative to said central axis;

said first stator pole section disposed axially between said first rotor pole section and second rotor pole section relative to said central axis and radially overlapping both said first rotor pole section and said second rotor pole section relative to said central axis;

a first axial air gap between said first rotor pole section and said first stator pole section;

a second axial air gap between said second rotor pole section and said first stator pole section;

said stator comprising windings operatively configured to be selectively energized to provide a flux path across said first axial air gap and said second axial air gap;

said first rotor pole section comprising a plurality of radially extending solid unitary pole pieces spaced circumferentially about said central axis;

said rotor comprising a first rotor toroid section extending radially from said rotor shaft portion relative to said central axis;

said first rotor toroid section disposed axially between said first rotor pole section and said second rotor pole section relative to said central axis; and said first rotor toroid section radially overlapping both said first rotor pole section and said second rotor pole section relative to said central axis.

2. The electric motor assembly set forth in claim 1, wherein said plurality of radially extending solid unitary pole pieces are each formed of a metal powder material.

3. The electric motor assembly set forth in claim 2, wherein said plurality of radially extending solid unitary pole pieces are each formed of a soft magnetic composite material.

4. The electric motor assembly set forth in claim 1, wherein said second rotor pole section comprises a plurality of radially extending solid unitary pole pieces spaced circumferentially about said central axis.

5. The electric motor assembly set forth in claim 4, wherein said plurality of radially extending solid unitary pole pieces of said second rotor pole section are each formed of a soft magnetic composite material.

6. The electric motor assembly set forth in claim 1, wherein:

said stator comprises a second stator pole section extending radially from said stator body section relative to said central axis and spaced axially from said first stator pole section relative to said central axis;

said second rotor pole section is disposed axially between said first stator pole section and second stator pole section and radially overlaps both said first stator pole section and said second stator pole section;

a third axial air gap is between said second rotor pole section and said second stator pole section; and said windings operatively configured to be selectively energized to provide a flux path across said third axial air gap.

7. The electric motor assembly set forth in claim 6, wherein each of said plurality of radially extending solid pole pieces of said first rotor pole section comprise discrete pole pieces having an inner end and an outer end.

8. The electric motor assembly set forth in claim 1, wherein said first stator pole section comprises a plurality of magnets and flux concentrators spaced circumferentially about said central axis.

9. The electric motor assembly set forth in claim 1, wherein said windings comprise a first conductive coil orientated about said central axis and disposed axially between said first rotor pole section and said second rotor pole section and disposed radially between said first stator pole section and said rotor shaft.

10. The electric motor assembly set forth in claim 6, wherein said windings comprise a first conductive coil orientated about said central axis and disposed axially between said first rotor pole section and said second rotor pole section and disposed radially between said first stator pole section and said rotor shaft, and a second conductive coil orientated about said central axis and disposed radially between said second stator pole section and said rotor shaft.

11. The electric motor assembly set forth in claim 1, wherein:

said windings comprise a first conductive coil orientated about said central axis and disposed axially between said first rotor pole section and said second rotor pole section;

said first conductive coil is disposed radially between said first stator pole section and said first rotor toroid section; and a first radial clearance is between said first conductive coil and said first rotor toroid section.

12. The electric motor assembly set forth in claim 11, comprising a first outer radial clearance between said first rotor pole section and said stator body section.

13. The electric motor assembly set forth in claim 1, wherein said first rotor toroid section is a solid unitary piece.

14. The electric motor assembly set forth in claim 13, wherein said first rotor toroid section is formed of a soft magnetic composite material.

15. The electric motor assembly set forth in claim 1, wherein said plurality of radially extending solid pole pieces spaced circumferentially about said central axis and said first rotor toroid section are formed as a unitary piece, having a monolithic and isotropic structure, and being of a uniform composition.

16. The electric motor assembly set forth in claim 15, wherein said plurality of radially extending solid pole pieces and said first rotor toroid section are formed of a soft magnetic composite material.

17. The electric motor assembly set forth in claim 1, wherein said plurality of radially extending solid unitary pole pieces spaced circumferentially about said central axis are each formed as a unitary piece, having a monolithic and isotropic structure, and being of a uniform composition of a soft magnetic composite material.

18. The electric motor assembly set forth in claim 1, comprising a third rotor pole section, a fourth rotor pole section, a second stator pole section, and a third stator pole section, and the first rotor pole section, the first stator pole section, the second rotor pole section, the second stator pole section, the third rotor pole section, the third stator pole section, and the fourth rotor pole section stacked in the axial direction.

* * * * *